(12) United States Patent
Hamada et al.

(10) Patent No.: US 8,827,564 B2
(45) Date of Patent: Sep. 9, 2014

(54) OUTER RING OF TAPERED ROLLER BEARING, TAPERED ROLLER BEARING, AND MANUFACTURING METHOD OF OUTER RING OF TAPERED ROLLER BEARING

(75) Inventors: Kazuki Hamada, Kashiwara (JP); Hiroshi Ueno, Tondabayashi (JP); Hitoshi Yano, Osaka (JP); Kanichi Koda, Kashiba (JP); Masashi Sakaguchi, Yao (JP); Toshihiko Shiraki, Yao (JP); Ryo Oonishi, Kashiba (JP)

(73) Assignee: Jtekt Corporation, Osaka (JP)

( * ) Notice: Subject to any disclaimer, the term of this patent is extended or adjusted under 35 U.S.C. 154(b) by 822 days.

(21) Appl. No.: 12/843,258

(22) Filed: Jul. 26, 2010

(65) Prior Publication Data
US 2011/0026867 A1 Feb. 3, 2011

(30) Foreign Application Priority Data

Jul. 31, 2009 (JP) ................................. 2009-179123
Sep. 8, 2009 (JP) ................................. 2009-206765

(51) Int. Cl.
| F16C 33/58 | (2006.01) |
| F16C 33/64 | (2006.01) |
| F16C 19/36 | (2006.01) |
| F16C 19/52 | (2006.01) |
| F16C 25/08 | (2006.01) |
| F16C 37/00 | (2006.01) |

(52) U.S. Cl.
CPC ............. *F16C 19/364* (2013.01); *F16C 33/588* (2013.01); *F16C 19/52* (2013.01); *F16C 25/08* (2013.01); *F16C 37/007* (2013.01)

USPC .......................................... 384/571; 384/569

(58) Field of Classification Search
USPC ......... 384/571, 569, 548, 581, 560, 565, 615, 384/621, 622, 513–515, 535; 29/898.01–898.066
See application file for complete search history.

(56) References Cited

U.S. PATENT DOCUMENTS

| 1,247,859 A | * | 11/1917 | Miller et al. ................... 384/571 |
| 1,672,012 A | * | 6/1928 | Tyson ........................... 384/565 |
| 1,830,493 A | * | 11/1931 | Tyson ........................... 384/581 |
| 3,404,925 A | * | 10/1968 | Bailey ........................... 384/535 |

(Continued)

FOREIGN PATENT DOCUMENTS

| DE | 1950 036 U | 11/1966 |
| DE | 10 2005 019 482 A1 | 11/2006 |

(Continued)

OTHER PUBLICATIONS

Description DE102005019482. European Patent Office: Patent Translate. http://translationportal.epo.org/emtp/translate/?ACTION=description-retrieval&COUNTRY=DE&ENGINE=google&FORMAT=docdb&KIND=A1&LOCALE=en_EP&NUMBER=102005019482&OPS=ops.epo.org&SRCLANG=de&TRGLANG=en.*

(Continued)

*Primary Examiner* — Daniel Yabut
(74) *Attorney, Agent, or Firm* — Oliff PLC

(57) ABSTRACT

A tapered cylinder portion, a radially extending portion, a cylindrical portion, a center backup portion, and a large diameter side curved portion are formed from an integral metallic plate.

21 Claims, 6 Drawing Sheets

(56) References Cited

U.S. PATENT DOCUMENTS

| | | | | |
|---|---|---|---|---|
| 3,504,955 | A | * | 4/1970 | Bailey .......................... 384/535 |
| 3,653,731 | A | | 4/1972 | Rau |
| 4,427,241 | A | * | 1/1984 | Jatczak ........................ 384/560 |
| 5,102,241 | A | * | 4/1992 | Pflungner .................... 384/499 |
| 5,154,517 | A | * | 10/1992 | Hodge .......................... 384/470 |
| 5,297,509 | A | * | 3/1994 | Murphy ..................... 123/90.39 |

FOREIGN PATENT DOCUMENTS

| | | | |
|---|---|---|---|
| DE | 102005019474 | * | 11/2006 |
| DE | 10 2006 004 752 A1 | | 8/2007 |
| JP | U-58-036627 | | 9/1981 |
| JP | A-11-048805 | | 2/1999 |

OTHER PUBLICATIONS

U.S. Appl. No. 13/304,546 in the name of Hamada et al, filed Nov. 25, 2011.

European Search Report issued in European Patent Application No. 10171239.6 dated Nov. 11, 2010.

* cited by examiner

OUTER RING OF TAPERED ROLLER BEARING, TAPERED ROLLER BEARING, AND MANUFACTURING METHOD OF OUTER RING OF TAPERED ROLLER BEARING

INCORPORATION BY REFERENCE

The disclosure of Japanese Patent Application No. 2009-179123 filed on Jul. 31, 2009 and Japanese Patent Application Publication No. 2009-206765 filed on Sep. 8, 2009 including the specification, drawings and abstract are incorporated herein by reference in their entirety.

BACKGROUND OF THE INVENTION

1. Field of the Invention

The invention relates to an outer ring of a tapered roller bearing, a tapered roller bearing, and a manufacturing method of an outer ring of a tapered roller bearing.

2. Description of the Related Art

Japanese Patent Application Publication No. 11-48805 (JP-A-11-48805) describes a tapered roller bearing. This tapered roller bearing rotatably supports a pinion shaft of a differential gear unit with respect to a housing of the differential gear unit.

This tapered roller bearing includes an outer ring, an inner ring, and a plurality of tapered rollers. The outer peripheral surface of the outer ring is fixed fitted to the inner peripheral surface of the housing. Meanwhile, the inner peripheral surface of the inner ring is fixed fitted to the outer peripheral surface of the pinion shaft. The plurality of tapered rollers is arranged with spaces between them in the circumferential direction, in a state retained by a retainer, between a tapered raceway surface of the outer ring and a tapered raceway surface of the inner ring. The outer ring of the tapered roller bearing is solid.

However, because the outer ring is solid, the tapered roller bearing is unable to trim weight, and when used in a vehicle, the operating costs and material costs increase.

Also, because the outer ring of the tapered roller bearing is solid, the grinding amount is large and the grinding time is long, so manufacturing costs increase.

SUMMARY OF INVENTION

This invention provides an outer ring of a tapered roller bearing, a tapered roller bearing, and manufacturing method of and outer ring of a tapered roller that are lightweight and can reduce operating costs, material costs, and manufacturing costs.

A first aspect of the invention relates to an outer ring of a tapered roller bearing. This outer ring of a tapered roller bearing includes a tapered cylinder portion having a tapered raceway surface of the outer ring on an inner periphery; a radially extending portion that extends in a substantially radial direction of the tapered cylinder portion from an end portion on a small diameter side of the tapered cylinder portion; a cylindrical portion that is connected at one end to an outer end portion in a radial direction of the radially extending portion, and extends to a large diameter side in a substantially axial direction of the bearing; a center backup portion that extends from an end portion on the large diameter side of the cylindrical portion to a substantially center portion in an axial direction of an outer peripheral surface of the tapered cylinder portion, and abuts against the substantially center portion; and a large diameter side curved portion that curves to an outside in the radial direction from an end portion on the large diameter side of the tapered cylinder portion, and in which an outside diameter of an outer end surface in the radial direction is substantially the same as an outside diameter of an outer peripheral surface of the cylindrical portion. The tapered cylinder portion, the radially extending portion, the cylindrical portion, the center backup portion, and the large diameter side curved portion are formed of an integral metallic plate.

Also, the integral metallic plate may include, for example, a flat plate made of metal, a seamless cylindrical metallic plate, and a cylindrical metallic plate having a seam, such as an electric resistance welded tube. Also, the integral metallic plate may include curved metallic plate material such as roof tile-shaped metallic plate.

In the aspect described above, the center portion refers to a portion other than both ends in the axial direction of the tapered cylinder portion. Incidentally, the portion of the tapered cylinder portion that the center backup portion backs up is near substantially the center in the axial direction of the tapered cylinder portion, based on a visual determination, from the standpoint of preventing deflection of the tapered raceway surface.

According to the aspect described above, the outer ring is manufactured from an integral metallic plate that is significantly lighter than a block of metal. Accordingly, the mass is significantly less than it is with a conventional solid outer ring. Therefore, when the outer ring is used in a vehicle, the operating costs are lower and the material costs are lower than they are with a solid outer ring. Also, according to this aspect, the outer ring is formed from an integral metallic plate, so grinding and the like is unnecessary, or the amount of grinding can be reduced, so manufacturing costs can be reduced.

Also, according to the aspect described above, the outer ring is formed of an integral metallic plate and is thus a single piece that functions as an outer ring. Therefore, as opposed to when the outer ring is formed by a plurality of parts, there is absolutely no need to adjust the parts, which facilitates assembly and handling.

Also, according to the aspect described above, the tapered cylinder portion that continues in the axial direction has the tapered raceway surface. This tapered raceway surface continues in the axial direction, so substantially the entire region in the axial direction of the rolling contact surface of the tapered roller can be supported by the tapered cylinder portion. Therefore, the tapered roller can roll stably and smoothly on the tapered raceway surface.

Also, according to the aspect described above, the radially extending portion is provided that extends in the substantially radial direction of the tapered cylinder portion from the end surface on the small diameter side of the tapered cylinder portion, so this radially extending portion is able to abut against the end surface in the axial direction of an outer ring mounting member such as a housing. Therefore, reaction force can be received by the end surface in the axial direction, so an axial load can be applied.

Also, according to the aspect described above, the cylindrical portion that is connected to the outer end portion in the radial direction of the radially extending portion and extends in the substantially axial direction of the tapered cylinder portion is provided, so this cylindrical portion can be fixed fitted to the inner peripheral surface of the outer ring mounting member. Also, similarly, the large diameter side curved portion that curves to the outside in the radial direction from the end portion on the large diameter side of the tapered cylinder portion, and in which the outside diameter of the outer end surface in the radial direction is substantially the same as the outside diameter of the outer peripheral surface of the cylindrical portion, is provided, so this large diameter side curved portion can be fixed fitted to the inner peripheral surface of an outer ring mounting member such as the housing. Therefore, the two locations where the cylindrical portion and the large diameter side curved portion are located apart from each other in the axial direction can be fixed to the inner peripheral surface of the outer ring mounting member, so the outer ring is able be stably and reliably fixed to the outer ring mounting member.

Also, according to the aspect described above, the center backup portion that extends from the other end of the cylindrical portion to near the center portion in the axial direction of the outer peripheral surface of the tapered cylinder portion and that backs up the center portion is provided, so deformation of the tapered raceway surface of the tapered cylinder portion can be prevented by this center backup portion.

Also, according to the aspect described above, the strength in the radial direction of the outer ring is able to be increased by the center backup portion, and the rigidity in the radial direction is able to be increased by the center backup portion and the large diameter side curved portion as well. Therefore, the rigidity in the radial direction is able to be increased at the three locations where the center backup portion, the radially extending portion, and the large diameter side curved portion are provided apart from each other in the axial direction, so the strength in the radial direction of the outer ring is able to be sufficient.

A second aspect of the invention relates to a tapered roller bearing. This tapered roller bearing includes the outer ring according to the first aspect described above, an inner ring having a tapered raceway surface of the inner ring on an outer periphery, and a tapered roller arranged between the tapered raceway surface of the outer ring and the tapered raceway surface of the inner ring.

According to this aspect, the outer ring of the first aspect described above is provided, so the mass is significantly less than it is when the outer ring is solid. Therefore, weight reduction, a reduction in operating costs, and reductions in material costs and manufacturing costs can be realized.

According to this aspect, the strain sensor of the first aspect described above is provided, so weight reduction can be achieved, operating costs, material costs, and manufacturing costs can be reduced, and less mounting space is required.

A third aspect of the invention relates to a manufacturing method of an outer ring of a tapered roller bearing. This manufacturing method of an outer ring includes opening a through-hole by press stamping in a flat plate made of metal; forming a tapered cylinder portion by plastic deforming the flat plate with the through-hole by press forming; forming a radially extending portion by plastic deforming a small diameter side end of the tapered cylinder portion by press forming; forming a cylindrical portion that extends to a large diameter side in an axial direction by plastic deforming an outside end in a radial direction of the radially extending portion by press forming; forming a center backup portion, that extends from an end on a side opposite the radially extending portion side of the cylindrical portion to near a substantially center portion in an axial direction of the tapered cylinder portion, by plastic deforming that end on the side opposite the radially extending portion side of the cylindrical portion by press forming; forming a large diameter side curved portion by curving the large diameter side end of the tapered cylinder portion by press forming; and grinding an end surface in a radial direction of the large diameter side curved portion, so that an outer diameter of the large diameter side curved portion becomes the same outer diameter as an outer diameter of the cylindrical portion.

A fourth aspect of the invention relates to a manufacturing method of an outer ring of a tapered roller bearing. This manufacturing method of an outer ring includes opening a through-hole by press stamping in a discoid flat plate made of metal; forming a radially extending portion by plastic deforming the flat plate with the through-hole by press forming; forming a tapered cylinder portion, that has an inside diameter that becomes larger farther away from the radially extending portion, on an inside in a radial direction of the radially extending portion by plastic deforming an inside end in the radial direction of the radially extending portion by press forming; forming a cylindrical portion that extends to a large diameter side in an axial direction on an outside in the radial direction of the radially extending portion by plastic deforming an outside end in the radial direction of the radially extending portion by press forming; forming a center backup portion, that extends from an end on a side opposite the radially extending portion side of the cylindrical portion to near a substantially center portion in an axial direction of the tapered cylinder portion, on the side opposite the radially extending portion side of the cylindrical portion by plastic deforming that end on the side opposite the radially extending portion side of the cylindrical portion; forming a large diameter side curved portion by curving a large diameter side end of the tapered cylinder portion by press forming; and grinding an end surface in a radial direction of the large diameter side curved portion, so that an outer diameter of the large diameter side curved portion becomes the same outer diameter as an outer diameter of the cylindrical portion.

BRIEF DESCRIPTION OF DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF EMBODIMENTS

Hereinafter, the invention will be described in greater detail with reference to the drawings.

Figure 1:
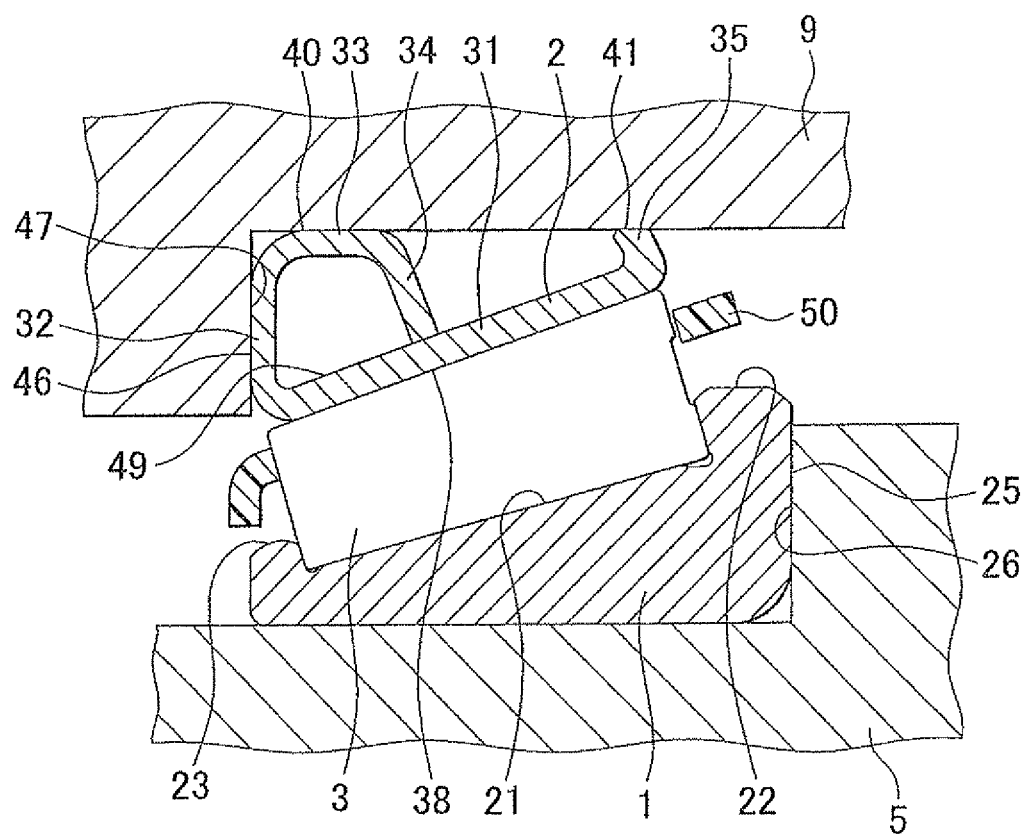
FIG. 1 is a sectional view showing a frame format in the axial direction of a tapered roller bearing according to a first example embodiment of the invention.

FIG. 1 is a sectional view showing a frame format in the axial direction of a tapered roller bearing according to a first example embodiment of the invention.

As shown in FIG. 1, this tapered roller bearing includes an inner ring 1 as an inner ring raceway member, an outer ring 2, and a plurality of tapered rollers 3. The inner ring 1 is fixed fitted to the outer peripheral surface of a shaft member 5. The inner ring 1 has a tapered raceway surface 21 of the inner ring 1, a large rib portion 22, and a small rib portion 23. The large rib portion 22 is positioned on the large diameter side of the tapered raceway surface 21, of the inner ring 1, while the small rib portion 23 is positioned on the small diameter side of the tapered raceway surface 21 of the inner ring 1. The shaft member 5 has a step portion 26 that extends in the radial direction. An end surface 25 on the large diameter side of the inner ring 1 abuts against this step portion 26.

The outer ring 2 is made press formed from an integral plate. Here, the material of the plate may be, for example, plastic formable bearing steel such as SUJ2, steel obtained by hardening, e.g., carbonitriding, plastic formable bearing steel, plastic formable metal such as common steel SPCC, carbon steel such as S55C, chrome molybdenum steel such as SCM415, and N22CB and N35CB (Nisshin Steel Co. Ltd standard) which takes pressability into account.

The outer ring 2 has a tapered cylinder portion 31, a radially extending portion 32, a cylindrical portion 33, a center backup portion 34, and a large diameter side curved portion 35.

The tapered cylinder portion 31 has a tapered raceway surface 38 of the outer ring 2 on the inner periphery. The radially extending portion 32 extends substantially radially from the end portion on the small diameter side of the tapered cylinder portion 31 to the one of the end portion in the axial direction of the cylindrical portion 33. One end of the cylindrical portion 33 is connected to the radially outer end portion of the radially extending portion 32. The cylindrical portion 33 extends in the substantially axial direction. The cylindrical portion 33 has a cylindrical outer peripheral surface 40.

The center backup portion 34 extends from the other end of the cylindrical portion 33 to near the center in the axial direction of the outer peripheral surface of the tapered cylinder portion 31 ("near the center" is determined visually by a person), and contacts the outer peripheral surface near the center of the tapered cylinder portion 31. In this way, the center backup portion 34 backs up the outer peripheral surface near the center of the tapered cylinder portion 31. The center backup portion 34 extends in the substantially normal, direction ("substantially" here is determined visually by a person) of the tapered raceway surface 38 of the outer ring 2 at the cross section in the axial direction. The center backup portion 34, the tapered cylinder portion 31, the radially extending portion 32, and the cylindrical portion 33 define a sealed chamber 49.

The large diameter side curved portion 35 is connected to the end portion on the large diameter side of the tapered cylinder portion 31. This large diameter side curved portion 35 is curved radially outward from the end portion on the large diameter side of the tapered cylinder portion 31, and extends substantially parallel to the center backup portion 34. The outer end surface in the radial direction of the large diameter side curved portion 35 is a cylindrical outer peripheral surface 41. The outside diameter of the cylindrical outer peripheral surface 41 of the large diameter side curved portion 35 is substantially the same as the outside diameter of the cylindrical outer peripheral surface 40 of the cylindrical portion 33.

The outer ring 2 is fixed fitted to the inner peripheral surface of a housing 9. More specifically, the cylindrical outer peripheral surface 40 of the cylindrical portion 33 and the cylindrical outer peripheral surface 41 of the large diameter side curved portion 35 are fixed fitted to the inner peripheral surface of the housing 9.

The end surface 46 that is on the side opposite the large diameter side curved portion 35 in the axial direction of the radially extending portion 32 abuts against a step portion 47 that extends in the radial direction of the housing 9. The outer surface 25 on the large diameter side of the inner ring 1 abuts against the step portion 26 of the shaft member 5, and the end surface 46 of the radially extending portion 32 abuts against the step portion 47 of the housing 9. In this way, the tapered roller bearing is clamped in the axial direction by the housing 9 and the shaft member 5, and a predetermined preload is generated in the axial direction in the tapered roller bearing. Also, as shown in FIG. 1, the plurality of tapered rollers 3 are arranged, with spaces between them in the circumferential direction in a state retained by a retainer 50, between the tapered raceway surface 21 of the inner ring 1 and the tapered raceway surface 38 of the outer ring 2.

The outer ring 2 is manufactured as described below, for example.

First, a through-hole is formed in a flat plate made of metal by press stamping. Next, the flat plate with the through-hole is plastic deformed by press forming to form a tapered cylinder portion. Then the small diameter side of the tapered cylinder portion is plastic deformed by press forming to form a radially extending portion. Next, the outer side in the radial direction of the radially extending portion is plastic deformed by press forming to form a cylindrical portion that extends in the axial direction. Next, the side opposite the radially extending portion side of the cylindrical portion is plastic deformed by press forming to form a center backup portion that extends from the side opposite the radially extending portion side of the cylindrical portion to near the center in the axial direction of the tapered cylinder portion. Then the large diameter side of the tapered cylinder portion is curved by press forming to form a large diameter side curved portion. Last, the end surface in the radial direction of the large diameter side curved portion is filed and the like to form a cylindrical outer peripheral surface. Incidentally, depending on the metal material of the flat plate, after forming the shape of the outer ring, heat treatment such as carburizing, carbonitriding, immersion quenching, induction hardening, annealing, and a combination of these, or curing such as shot peening, may also be performed.

Also, as another method, the outer ring 2 may also be formed as follows.

First, a through-hole is formed in a discoid flat plate made of metal by press stamping to form a radially extending portion. Next, the inner side in the radial direction of the radially extending portion is plastic deformed by press forming, such that a tapered cylinder portion, in which the inside diameter becomes larger farther away from the radially extending portion, is formed on the inner side in the radial direction of the radially extending portion. Then, the outer side in the radial direction of the radially extending portion is plastic deformed by press forming such that a cylindrical portion that extends in the axial direction is formed on the outer side in the radial direction of the radially extending portion. Then, the side opposite the radially extending portion side of the cylindrical portion is plastic deformed by press forming to form a center backup portion, that extends from the side opposite the radially extending portion side of the cylindrical portion to near the center in the axial direction of the tapered cylinder portion, on the side opposite the radially extending portion side of the cylindrical portion. Then the large diameter side of the tapered cylinder portion is curved by press forming to form a large diameter side curved portion. Last, the end surface in the radial direction of the large diameter side curved portion is filed and the like to form a cylindrical outer peripheral surface.

According to the outer ring 2 of this first example embodiment, the outer ring 2 can be manufactured from an integral metallic plate that is significantly lighter than a block of metal. Accordingly, the mass is significantly less than it is with a solid outer ring. More specifically, the outer ring 2 of the first example embodiment can be manufactured with approximately 40% (though not limited to approximately 40%), of the mass of a solid outer ring of a tapered roller bearing having substantially the same tapered raceway surface as that outer ring 2, so the mass is less than it is with a solid outer ring. Therefore, when the outer ring 2 of the first example embodiment is used in a vehicle, the operating costs are lower and the material costs are lower than they are with a solid outer ring. Also, with the outer ring 2 of the first example embodiment, the outer ring 2 is formed from an integral metallic plate, so grinding and the like is unnecessary, or the amount of grinding can be reduced, so manufacturing costs can be reduced.

Also, the outer ring 2 of the first example embodiment is formed of an integral plate and is thus a single piece that functions as an outer ring, so as opposed to when the outer ring is formed with a plurality of parts, there is absolutely no need to adjust the parts, which facilitates assembly and handling.

Also, the outer ring 2 of this first example embodiment has the tapered raceway surface 38 of outer ring 2 that continues in the axial direction. Accordingly, the tapered raceway surface 38 of the outer ring 2 continues in the axial direction, so substantially the entire region in the axial direction of the rolling contact surface of the tapered roller 3 can be supported by the tapered cylinder portion 31. Therefore, the tapered roller 3 can roll stably and smoothly on the tapered raceway surface 38 of the outer ring 2.

Also, the outer ring 2 of this first example embodiment has the radially extending portion 32 that extends in the substantially radial direction of the tapered cylinder portion 31 from the end surface on the small diameter side of the tapered cylinder portion 31. Accordingly, this radially extending portion 32 is able to abut against the step portion 47 in the axial direction of the housing 9. Therefore, an axial load can be applied to the outer ring 2, because reaction force can be received from the step portion 47 of the housing 9.

Also, the outer ring 2 of this first example embodiment has the cylindrical portion 33 that is connected to the outer end portion in the radial direction of the radially extending portion 32 and extends in the substantially axial direction of the tapered cylinder portion 31. Accordingly, this cylindrical portion 33 can be fixed fitted to the inner peripheral surface of the housing 9. Also, similarly, the outer peripheral surface of the large diameter side curved portion 35 that extends curved to the outside in the radial direction from the end portion on the large diameter side of the tapered cylinder portion 31 can be fixed fitted to the inner peripheral surface of the housing 9. Therefore, the two locations where the cylindrical portion 33 and the large diameter side curved portion 35 are located apart from each other in the axial direction can be fixed to the inner peripheral surface of the housing 9, so the outer ring 2 is able to be stably and reliably fixed to the housing 9.

Also, the outer ring 2 of the first example embodiment has the center backup portion 34 that extends from the other end of the cylindrical portion 33 to near the center in the axial direction of the outer peripheral surface of the tapered cylinder portion 31 and backs up (i.e., supports) the portion near the center. Accordingly, deformation of the tapered raceway surface 38 of the outer ring 2 can be prevented by this center backup portion 34.

Also, with the outer ring 2 of this first example embodiment, the strength in the radial direction of the outer ring 2 is able to be increased by the center backup portion 34, and the rigidity in the radial direction is able to be increased by the radially extending portion 32 and the large diameter side curved portion 35 as well. Therefore, the rigidity in the radial direction is able to be increased at the three locations where the center backup portion 34, the radially extending portion 32, and the large diameter side curved portion 35 are provided apart from each other in the axial direction, so the strength in the radial direction of the outer ring 2 is able to be sufficient.

Also, with the outer ring 2 of this first example embodiment, the center backup portion 34 extends in the substantially normal direction of the tapered raceway surface 38 of the outer ring 2, so the deformation preventing effect of the tapered raceway surface 38 of the outer ring 2 can be enhanced. More specifically, in this first example embodiment, the center backup portion 34 contacts the portion near the center of the tapered cylinder portion 31 that is the load applying point, so deflection of the tapered raceway surface 38 of the outer ring 2 can be effectively prevented.

Also, with the outer ring 2 of this first example embodiment, the outer ring 2 is formed by press forming an integral metallic plate, so the manufacturing costs can be reduced and productivity can be improved.

Also, with the outer ring 2 of this first example embodiment, the large diameter side curved portion 35 extends substantially parallel to the center backup portion 34, so the strength in the radial direction can be further increased.

Also, with the tapered roller bearing of this first example embodiment, the outer ring 2 is lighter than a solid outer ring, so the mass of the tapered roller bearing is significantly less.

Incidentally, with the outer ring 2 of this first example embodiment, the outer ring 2 is formed by press forming an integral plate made of metal, but the outer ring may also be formed by using an integral plate made of metal using other plastic processing such as rolling or forge processing.

Also, with the outer ring 2 of this first example embodiment, the outer ring 2 is formed from a flat metallic plate, but the outer ring may also be formed by plastic deforming a seamless tubular metal body. Alternatively, the outer ring may be formed by plastic deforming a cylindrical metal body having a seam, such as an electric resistance welded tube.

Also, with the outer ring 2 of the first example embodiment, the center backup portion 34 extends in the substantially normal direction of the tapered raceway surface 38 of the outer ring 2, but the center backup portion 34 does not have to extend in the normal direction of the tapered raceway surface 38 of the outer ring 2.

Figure 2:
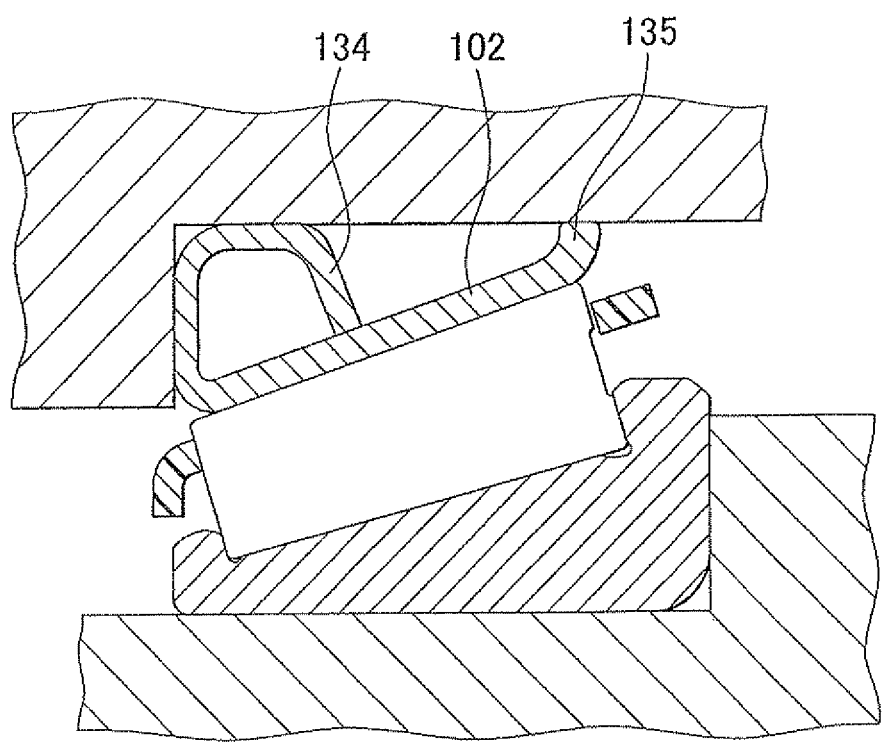
FIG. 2 is a sectional view showing a frame format in the axial direction of a tapered roller bearing according to a modified example of the first example embodiment.

Also, with the outer ring 2 of the first example embodiment, the large diameter side curved portion 35 extends substantially parallel to the center backup portion 34. However, as shown in the sectional view that shows a frame format in the axial direction of a tapered roller bearing according to a modified example of the first example embodiment shown in FIG. 2, a large diameter side curved portion 135 of an outer ring 102 does not have to extend parallel to a center backup portion 134. For example, it may extend substantially parallel to a radially extending portion, as shown in FIG. 2.

Incidentally, the use application of the tapered roller bearing according to the first example embodiment and the modified example thereof is not limited to that described above. Also, the tapered roller bearing of the first example embodiment and the modified example thereof may be used either in an environment in which fluid (such as lubricating oil or cleaning fluid) outside the tapered roller bearing may contact the tapered rollers, or in an environment in which fluid outside the tapered roller bearing may not contact the tapered rollers.

Incidentally, when a metallic plate that has a surface roughness equal to or greater than a predetermined degree is used as a material for manufacturing the tapered raceway surface, i.e., when the outer ring is formed by press forming that metallic plate, it is confirmed that sufficient accuracy can be obtained to the tapered raceway surface of the outer ring. Therefore, it is confirmed that grinding and the like of the tapered raceway surface of the outer ring is unnecessary. Therefore, with the outer ring of this example embodiment and the modified example thereof, the man-hours required for manufacturing can be significantly reduced.

Figure 3:
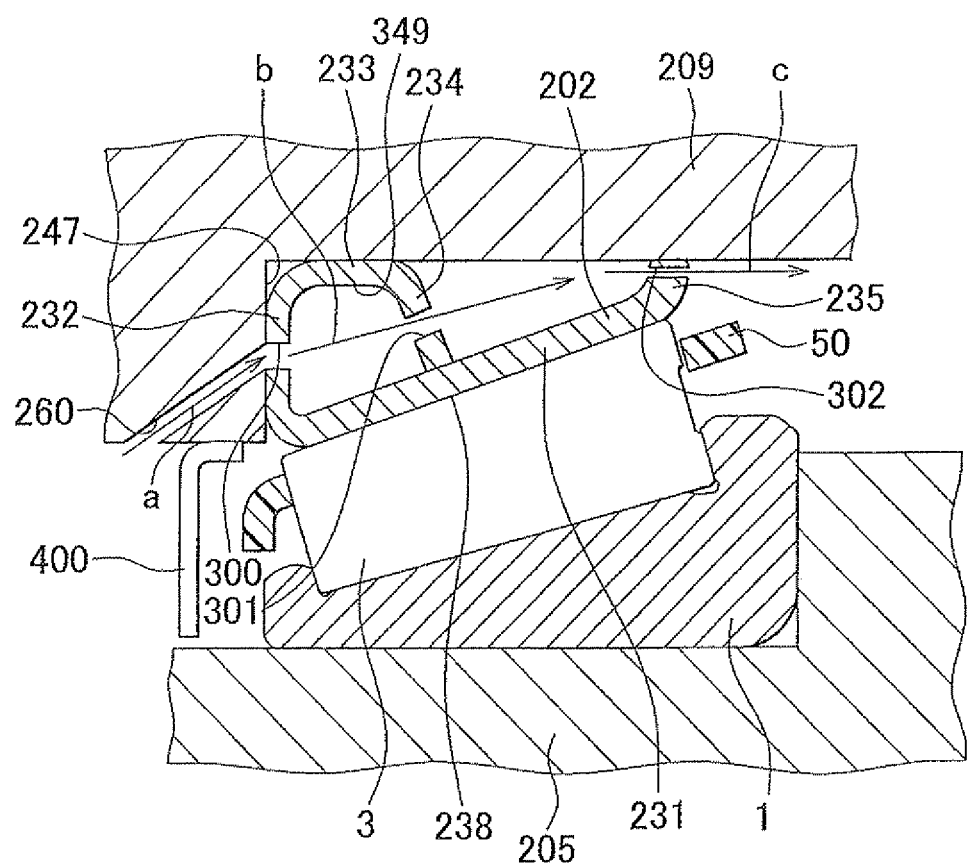
FIG. 3 is a sectional view showing a frame format in the axial direction of a tapered roller bearing according to a second example embodiment of the invention.

FIG. 3 is a sectional view showing a frame format in the axial direction of a tapered roller bearing according to a second example embodiment of the invention.

The tapered roller bearing of the second example embodiment differs from the tapered roller bearing of the first example embodiment only with respect to the structure of an outer ring 202. In the second example embodiment, component parts that are the same as component parts in the first example embodiment will be denoted by like reference numerals, and descriptions thereof will be omitted. Also, in the second example embodiment, descriptions of modified examples and operational effects that are common with the first example embodiment will be omitted. Only the structure, operational effects, and modified examples that differ from the first example embodiment will be described.

This tapered roller bearing is used in a vehicular pinion shaft support device that supports a vehicular pinion shaft of a differential gear unit, a transaxle unit, or a transfer unit or the like. More specifically, the tapered roller bearing includes an inner ring 1 as an inner ring raceway member, and an outer ring 202. The inner ring 1 is fixed fitted by press-fitting onto a pinion shaft 205 of the vehicular pinion shaft support device. Also, the outer ring 202 is fixed fitted to a housing 209 of the vehicular pinion shaft support device.

The outer ring 202 has a tapered cylinder portion 231, a radially extending portion 232, a cylindrical portion 233, a center backup portion 234, and a large diameter side curved portion 235.

The outer ring 202 differs from the outer ring 2 of the first example embodiment in that the radially extending portion 232 has a first through-hole 300, the center backup portion 234 has a second through-hole 301, and the large diameter side curved portion 235 has a third through-hole 302. Also, the outer ring 202 differs from the outer ring 2 of the first example embodiment in that the large diameter side curved portion 235 is not parallel to the center backup portion 234, but instead extends in the substantially radial direction of the inner ring 1.

As shown in FIG. 3, the first through-hole 300 extends in the substantially axial direction, and the second through-hole 301 extends substantially parallel to the tapered raceway surface 238 of the outer ring 202. Also, the third through-hole 302 extends in the substantially axial direction.

As shown in FIG. 3, the radially extending portion 232 abuts against a step portion 247 of the housing 209. Also, the housing 209 has a through-hole 260 that extends from the inner peripheral surface of the housing 209 to the surface of the step portion 247 that the radially extending portion 232 abuts against.

In FIG. 3, arrow "a" indicates the direction of the flow of gear oil of the vehicular pinion shaft support device that passes through the through-hole 260, arrow "b" indicates the direction of the flow of gear oil that passes through the second through-hole 301, and arrow "c" indicates the direction of the flow of gear oil that passes through the third through-hole 302.

The central axis of the first through-hole 300, the central axis of the second through-hole 301, and the central axis of the third through-hole 302 are not in the same straight line. Therefore, the directions "a", "b", and "c" of the three flows do not match up with each other, so the gear oil does not flow out smoothly from the radially extending portion 232 to the large diameter side curved portion 235.

Also, although not described in detail, this tapered roller bearing has an annular seal member 400 fixed to the housing 209 near the opening on the inlet side of the flow of the gear oil between the inner ring 1 and the outer ring 202. This seal member 400 makes it difficult for the gear oil to get into the tapered roller bearing.

According to the tapered roller bearing of this second example embodiment, the radially extending portion 232, the center backup portion 234, and the large diameter side curved portion 235 have the through-holes 300, 301, and 302, respectively, so the gear oil is able to flow from one side to the other side in the axial direction while contacting the tapered cylinder portion 231, the radially extending portion 232, the center backup portion 234, and the large diameter side curved portion 235. Therefore, because the gear oil is restricted from getting between the outer ring 202 and the inner ring 1 by the seal member 400, the outer ring 202, or more specifically the tapered cylinder portion 231 that generates heat from the friction of the tapered raceway surface 238 of the outer ring 202, can be cooled efficiently without almost any gear oil flowing between the outer ring 202 and the inner ring 1. Therefore, oil agitation loss of the tapered rollers 3 due to the presence of gear oil and torque due to rolling viscosity resistance of the tapered rollers 3 can be reduced, so fuel consumption of a vehicle or the like provided with this tapered roller bearing can be reduced.

Also, with the tapered roller bearing of this second example embodiment, the first through-hole 300, the second through-hole 301, and the third through-hole 302 are not in the same straight line, so the flow of gear oil that passes through these through-holes 301, 302, and 303 becomes a turbulent flow. Therefore, the gear oil is able to contact a larger surface area of the outer ring 202, so the cooling effect of the outer ring 202, more particularly the tapered cylinder portion 231, can be increased. Also, the structure is such that the gear oil passes through a chamber 349 defined by the tapered cylinder portion 231, the radially extending portion 232, the cylindrical portion 233, and the center backup portion 234, so compared with a structure in which a through-hole is provided in a solid outer ring, the size of the surface area of the outer ring that the gear oil contacts can be made about 100 times larger. Therefore, the cooling effect can be significantly greater.

Incidentally, in this second example embodiment, the gear oil outside the tapered roller bearing is able to contact the tapered rollers 3, but the fluid outside the tapered roller bearing that is able to contact the tapered rollers is not limited to gear oil. That is, it may also be another type of lubricating oil or cleaning fluid. Also, in this example embodiment, there does not have to be any fluid outside the tapered roller bearing that is able to contact the tapered rollers. Also, the structure may be such that coolant such as cooling water passes through the first through-hole, the second through-hole, and the third through-hole.

Also, as a method that is able to easily realize a state in which the central axis of the first through-hole, the central axis of the second through-hole, and the central axis of the third through-hole are not in the same straight line, for example, there is a method that points the central axis of the first through-hole toward the tapered cylinder portion. In this way, there is a method in which the fluid that has passed through the first through-hole will pass through the second through-hole after striking the tapered cylinder portion.

Also, as a method that is able to easily realize a state in which the central axis of the first through-hole, the central axis of the second through-hole, and the central axis of the third through-hole are not in the same straight line, for example, there is a method that forms the central axis of the first through-hole and the central axis of the second through-hole in different positions in the circumferential direction of the outer ring, and forms the central axis of the second through-hole and the central axis of the third through-hole in different positions in the circumferential direction of the outer ring.

Further, it is also possible to form the opening on the first through-hole side of the second through-hole so that it does not overlap with the trajectory, that extends along the central axis of the first through-hole, of the opening on the second through-hole side of the first through-hole, and form the opening on the second through-hole side of the first through-hole so that it does not overlap with the trajectory, that extends along the central axis of the second through-hole, of the opening on the first through-hole side of the second through-hole. It is also possible to form the opening on the second through-hole side of the third through-hole so that it does not overlap with the trajectory, that extends along the central axis of the second through-hole, of the opening on the third through-hole side of the second through-hole, and form the opening on the third through-hole side of the second through-hole so that it does not overlap with the trajectory, that extends along the central axis of the third through-hole, of the opening on the second through-hole side of the third through-hole.

Also, the first, second, and third through-holes are able to be formed easily and inexpensively when the outer ring of second example embodiment is formed by press forming.

Figure 4:
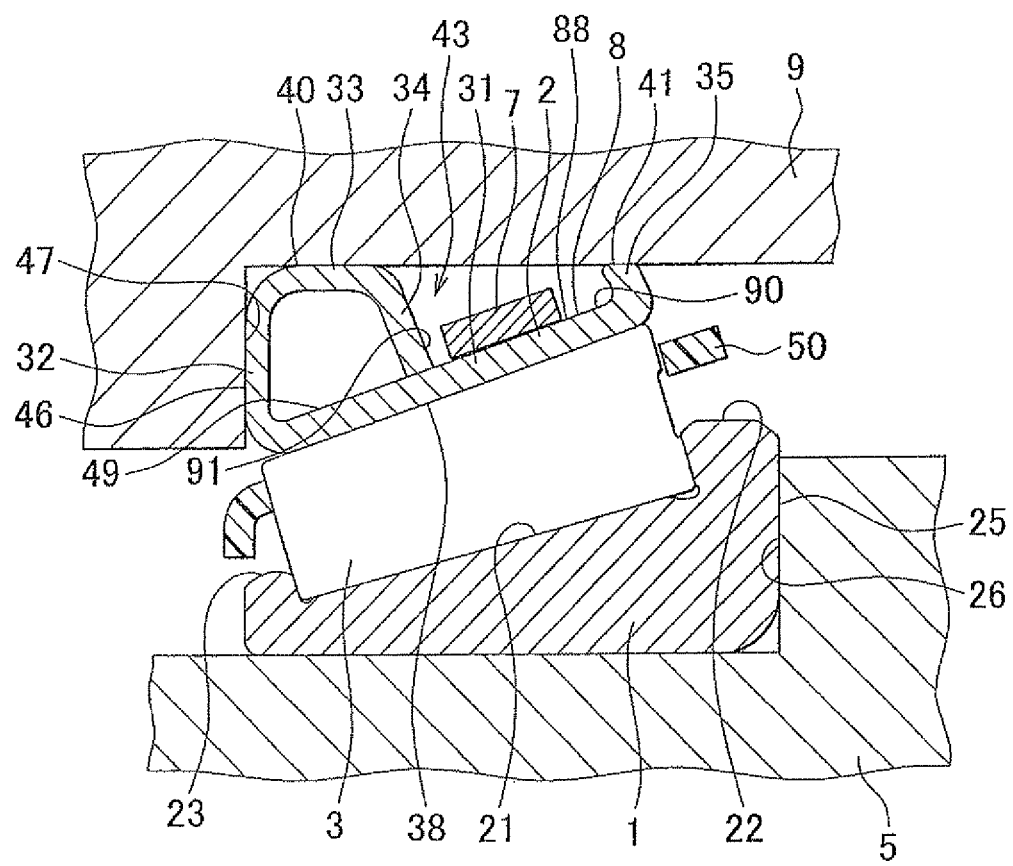
FIG. 4 is a sectional view in the axial direction of a sensor-equipped tapered roller bearing according to a third example embodiment of the invention.

FIG. 4 is a sectional view showing a frame format in the axial direction of a sensor-equipped tapered roller bearing according to a third example embodiment of the invention.

This sensor-equipped tapered roller bearing includes the inner ring 1 as the inner ring raceway member, a sensor-equipped outer ring 43, and the plurality of tapered rollers 3. The sensor-equipped outer ring 43 has the outer ring 2 and a strain gauge 7 as a strain sensor.

The inner ring 1 is fixed fitted to the outer peripheral surface of the shaft member 5.

The strain gauge 7 is fixed to an outer peripheral surface 88 of the tapered cylinder portion 31 of the outer ring 2. The strain gauge 7 is located between the center backup portion 34 and the large diameter side curved portion 35. The strain gauge 7 is positioned apart from the housing 9 with a gap left therebetween, while the outer ring 2 is fixed to the housing 9. The strain gauge 7 is arranged inside a sealed chamber 90 defined by the housing 9, the center backup portion 34, the tapered cylinder portion 31, and the large diameter side curved portion 35, while the outer ring 2 is fixed to the housing 9. In other words, the strain gauge 7 is arranged inside a concave portion 91 of the outer ring 2 that is defined by the center backup portion 34, the tapered cylinder portion 31, and the large diameter side curved portion 35.

Figure 5:
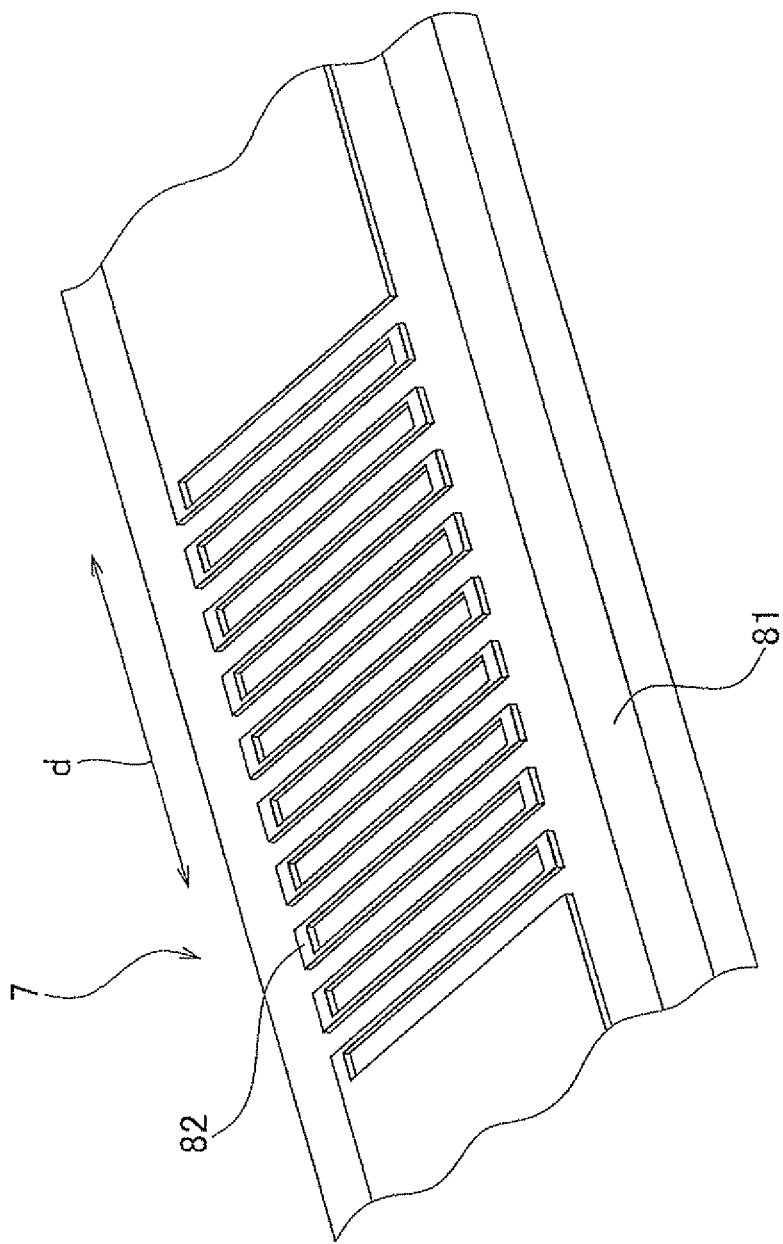
FIG. 5 is a view showing a frame format of a strain gauge of the sensor-equipped tapered roller bearing.

FIG. 5 is an enlarged view showing a frame format of the area around a portion of the strain gauge 7. Incidentally, in FIG. 5, arrow "d" indicates the longitudinal direction of the strain gauge 7.

The strain gauge 7 has a resin portion 81 and a metal wire portion 82. The resin portion 81 is made of resin material such as polyimide and has a rectangular parallelepiped shape. Also, the metal wire portion 82 is formed of metal wire such as copper wire, and that metal wire is formed snaking along the top of the resin portion 81. The direction in which the metal wire portion 82 advances as it snakes matches the longitudinal direction of the strain gauge 7.

The strain gauge 7 is fixed to the outer peripheral surface 88 such that the longitudinal direction "d" of the strain gauge 7 matches the direction perpendicular to the circumferential direction of the outer peripheral surface 88 (see FIG. 4) of the tapered cylinder portion 31 of the outer ring 2.

Figure 6:
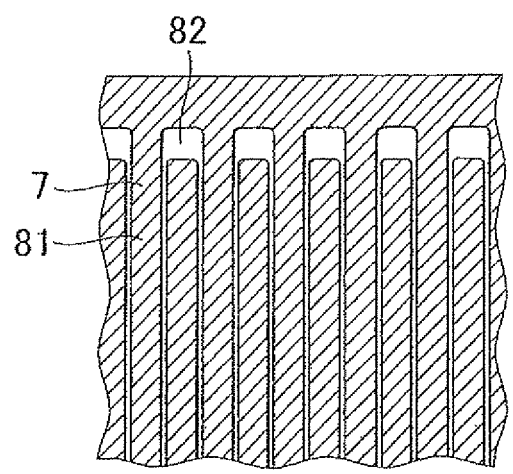
FIG. 6 is a plane view of a portion of the strain gauge.

FIG. 6 is a plane view of a portion of the strain gauge 7.

In FIG. 6, the portion indicated by the diagonal hatching is the resin portion 81, and the snaking portion, where there is no hatching, between the portions indicated by the diagonal hatching is the metal wire portion 82.

The strain gauge 7 shown in FIG. 5 and FIG. 6 deforms by the same degree as the degree that the tapered cylinder portion 31 that is the measured object deforms by. Also, when the metal wire portion 82 of the strain gauge 7 stretches, the sectional area decreases and the length increases, and as a result, the resistance value increases. The strain of the tapered cylinder portion 31 is measured by measuring the resistance value of this metal wire portion, and the preload of the sensor-equipped tapered roller bearing is measured. Also, although not described in detail, a signal from the strain gauge 7 is read via wiring covered by an insulator that is inserted through a through-hole (not shown) formed in the housing 9.

In the structure described above, with the sensor-equipped tapered roller bearing in the third example embodiment, during assembly or operation, if the preload that is measured based on the signal from the strain gauge 7 differs from a desired preload, the preload is set to the desired preload by appropriately adjusting the distance between the step portion 47 of the housing 9 and the step portion 26 of the shaft member 5 by appropriately adjusting the tightness of a screw (not shown).

In addition to the effects of the first example embodiment described above, the effects described below can also be obtained.

According to the sensor-equipped outer ring 43 of the third example embodiment, the strain gauge 7 is fixed to the outer peripheral surface 88 of the tapered cylinder portion 31, so the preload during assembly, or the preload during operation, of the sensor-equipped tapered roller bearing provided with this sensor-equipped outer ring 43 can be accurately measured based on the measurement value of the strain gauge 7. Therefore, during assembly, the desired preload can be precisely set, and during operation, the preload can be appropriately adjusted accordingly based on the measurement value of the strain gauge 7.

Also, according to the sensor-equipped outer ring 43 of the third example embodiment, the strain gauge 7 is arranged in the concave portion 91 that is defined by the tapered cylinder portion 31, the center backup portion 34, and the large diameter side curved portion 35, and the strain gauge 7 is mounted in the chamber 90 that will become a sealed chamber, while the outer ring 2 is mounted to the housing 9, so the mounting space of the outer ring 2 does not change before and after the strain gauge 7 is mounted to the outer ring 2. Therefore, it is possible to realize a sensor-equipped tapered roller bearing that requires a small mounting space when the sensor-equipped outer ring 43 of this example embodiment is used.

Also, the according to the sensor-equipped outer ring 43 of the third example embodiment, the strain gauge 7 is arranged inside the concave portion 91 of the outer ring 2 instead of in the chamber 49 of the outer ring 2. Therefore, the degree of freedom in the timing at which the strain gauge 7 is fixed can be increased, so mounting ease of the strain gauge 7 can be increased. That is, with the structure in which the strain gauge is arranged in the chamber of the outer ring, the strain gauge must be fixed to the metallic plate before the chamber of the outer ring is complete. Therefore, with a structure in which the strain gauge 7 is arranged in the concave portion 91 of the outer ring 2, as in the third example embodiment, there is no restriction on the timing at which the strain gauge 7 is mounted to the outer ring 2.

Also, with the sensor-equipped outer ring 43 of the third example embodiment, the strain gauge 7 is positioned on the outer peripheral surface of the tapered cylinder portion 31, on the large diameter side curved portion 35 side. However, in this example embodiment, the strain gauge 7 may also be positioned on the outer peripheral surface of the tapered cylinder portion 31, on the radially extending portion 32 side.

Also, with the sensor-equipped outer ring 43 of the third example embodiment, the strain gauge 7 uses the resistance of the metal resistance wire. However, the strain sensor of this example embodiment may also use the resistance of a silicon semiconductor instead of the resistance of a metal resistor. Also, the strain sensor of this example embodiment may be a sensor that measures displacement using light, temperature, or ultrasonic waves or the like. The strain sensor of this example embodiment may be any type of sensor as long as it is a sensor capable of measuring the displacement of the tapered cylinder portion.

Figure 7:
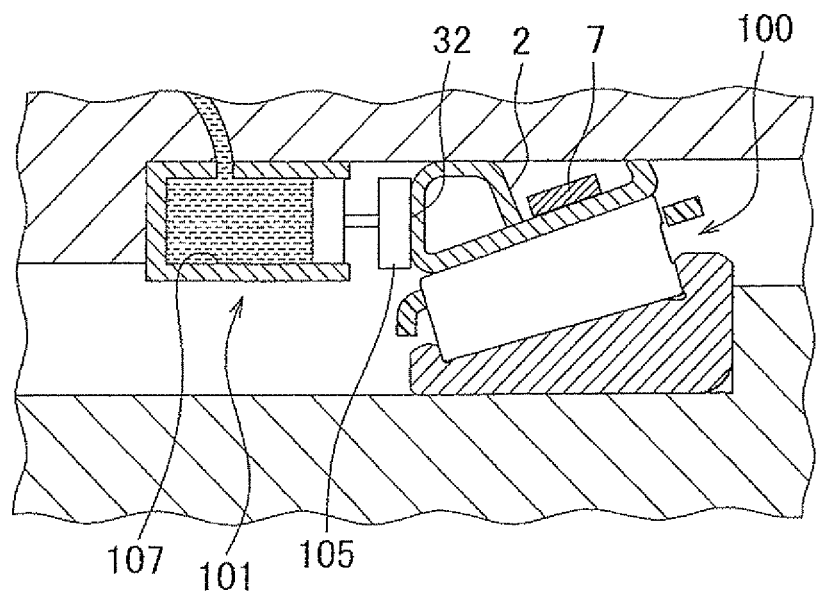
FIG. 7 is a sectional view in the axial direction of a sensor-equipped tapered roller bearing device according to a fourth example embodiment of the invention.

FIG. 7 is a sectional view in the axial direction of a sensor-equipped tapered roller bearing device according to a fourth example embodiment of the invention.

This sensor-equipped tapered roller bearing device (hereinafter, simply referred to as "bearing device") includes a sensor-equipped tapered roller bearing 100 that is the same as the sensor-equipped tapered roller bearing of the third example embodiment, and a preload adjusting piston mechanism 101.

This bearing device has a microcomputer, not shown, and calculates the preload of the sensor-equipped tapered roller bearing 100 based on the signal from the strain gauge 7 with this microcomputer. If the calculated preload value is a preload that differs from the desired preload during assembly or operation, the microcomputer outputs a signal indicates supply or discharge of oil to an oil supply portion, not shown, of the preload adjusting piston mechanism 101.

In this way, the position in the axial direction of a pressing portion 105 of the piston is adjusted appropriately by adjusting the volume of a chamber 107 into which the oil in the piston of the preload adjusting piston mechanism 101 is charged. Then, the preload of the sensor-equipped tapered roller bearing 100 is adjusted to a desired preload by appropriately adjusting the position in the axial direction of the radially extending portion 32 of the outer ring 2 that is abutting in the axial direction against the pressing portion 105, based on the adjustment of the position in the axial direction of this pressing portion 105.

According to the bearing device of this fourth example embodiment, the load applying ability of the sensor-equipped tapered roller bearing 100 is able to be constantly automatically adjusted. Also, the sensor-equipped tapered roller bearing 100 can be prevented from breaking from an excessive load being placed on the sensor-equipped tapered roller bearing 100.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. An outer ring of a tapered roller bearing, comprising:
a tapered cylinder portion having a tapered raceway surface of the outer ring on an inner periphery;
a radially extending portion that extends in a substantially radial direction of the tapered cylinder portion from an end portion on a small diameter side of the tapered cylinder portion;
a cylindrical portion that is connected at one end to an outer end portion in a radial direction of the radially extending portion, and extends to a large diameter side in a substantially axial direction of the bearing;
a center backup portion that extends from an end portion on the large diameter side of the cylindrical portion to an outer peripheral surface of the tapered cylinder portion, an only point of contact between the center backup portion and the outer peripheral surface of the tapered cylinder portion being at a substantially center portion in the axial direction of an outer peripheral surface of the tapered cylinder portion; and
a large diameter side curved portion that curves to an outside in the radial direction from an end portion on the large diameter side of the tapered cylinder portion, and in which an outside diameter of an outer end surface in the radial direction is substantially the same as an outside diameter of an outer peripheral surface of the cylindrical portion,
wherein the tapered cylinder portion, the radially extending portion, the cylindrical portion, the center backup portion, and the large diameter side curved portion are formed of an integral metallic plate, and
wherein the substantially center portion is axially spaced from the large diameter side curved portion.

2. The outer ring according to claim 1, wherein the center backup portion extends in a substantially normal direction of the tapered raceway surface of the outer ring.

3. The outer ring according to claim 1, wherein the integral metallic plate is press formed.

4. The outer ring according to claim 1, wherein the large diameter side curved portion extends substantially parallel to the center backup portion.

5. The outer ring according to claim 1, wherein the large diameter side curved portion extends substantially parallel to the radially extending portion.

6. The outer ring according to claim 1, wherein:
the radially extending portion has a first through-hole that passes through the radially extending portion;
the center backup portion has a second through-hole that passes through the center backup portion; and
the large diameter side curved portion has a third through-hole that passes through the large diameter side curved portion.

7. The outer ring according to claim 6, wherein the first through-hole, the second through-hole, and the third through-hole are not formed in the same straight line.

8. The outer ring according to claim 7, wherein a central axis of the first through-hole points toward the substantially center portion of the tapered cylinder portion.

9. The outer ring according to claim 7, wherein:
a central axis of the first through-hole and a central axis of the second through-hole are formed in different positions in a circumferential direction of the outer ring; and
the central axis of the second through-hole and a central axis of the third through-hole are formed in different positions in the circumferential direction of the outer ring.

10. The outer ring according to claim 1, wherein the center backup portion, the tapered cylinder portion, the radially extending portion, and the cylindrical portion define a sealed chamber.

11. A tapered roller bearing comprising:
the outer ring according to claim 1;
an inner ring having a tapered raceway surface of the inner ring on an outer periphery; and
a tapered roller arranged between the tapered raceway surface of the outer ring and the tapered raceway surface of the inner ring.

12. The outer ring according to claim 1, further comprising:
a strain sensor that is fixed to the outer peripheral surface of the tapered cylinder portion.

13. The outer ring according to claim 12, wherein the strain sensor is positioned between the center backup portion and the large diameter side curved portion.

14. The outer ring according to claim 13, wherein the strain sensor is positioned on the outer peripheral surface of the tapered cylinder portion, closer to the large diameter side curved portion than the radially extending portion.

15. The outer ring according to claim 13, wherein the strain sensor is positioned on the outer peripheral surface of the tapered cylinder portion, closer to the radially extending portion than the large diameter side curved portion.

16. A tapered roller bearing comprising:
the outer ring according to claim 12;
an inner ring having a tapered raceway surface of the inner ring on an outer periphery; and
a tapered roller arranged between the tapered raceway surface of the outer ring and the tapered raceway surface of the inner ring.

17. A manufacturing method of an outer ring of a tapered roller bearing, comprising:
opening a through-hole by press stamping in a flat plate made of metal;
forming a tapered cylinder portion by plastic deforming the flat plate with the through-hole by press forming;
forming a radially extending portion by plastic deforming a small diameter side end of the tapered cylinder portion by press forming;
forming a cylindrical portion that extends to a large diameter side in an axial direction by plastic deforming an outside end in a radial direction of the radially extending portion by press forming;
forming a center backup portion, that extends from an end on a side opposite the radially extending portion side of the cylindrical portion to an outer peripheral surface of the tapered cylinder portion, an only point of contact between the center backup portion and the outer peripheral surface of the tapered cylinder portion being at a substantially center portion in an axial direction of the outer peripheral surface of the tapered cylinder portion, by plastic deforming the end on the side opposite the radially extending portion side of the cylindrical portion by press forming;
forming a large diameter side curved portion by curving the large diameter side end of the tapered cylinder portion by press forming; and
grinding an end surface in a radial direction of the large diameter side curved portion, so that an outer diameter of the large diameter side curved portion becomes the same outer diameter as an outer diameter of the cylindrical portion.

18. A manufacturing method of an outer ring of a tapered roller bearing, comprising:
opening a through-hole by press stamping in a discoid flat plate made of metal;
forming a radially extending portion by plastic deforming the flat plate with the through-hole by press forming;
forming a tapered cylinder portion, that has an inside diameter that becomes larger farther away from the radially extending portion, on an inside in a radial direction of the radially extending portion by plastic deforming an inside end in the radial direction of the radially extending portion by press forming;
forming a cylindrical portion that extends to a large diameter side in an axial direction on an outside in the radial direction of the radially extending portion by plastic deforming an outside end in the radial direction of the radially extending portion by press forming;
forming a center backup portion, that extends from an end on a side opposite the radially extending portion side of the cylindrical portion to an outer peripheral surface of the tapered cylinder portion, an only point of contact between the center backup portion and the outer peripheral surface of the tapered cylinder portion being at a substantially center portion in an axial direction of the outer peripheral surface of the tapered cylinder portion, on the side opposite the radially extending portion side of the cylindrical portion by plastic deforming that end on the side opposite the radially extending portion side of the cylindrical portion;
forming a large diameter side curved portion by curving a large diameter side end of the tapered cylinder portion by press forming; and
grinding an end surface in a radial direction of the large diameter side curved portion, so that an outer diameter of the large diameter side curved portion becomes the same outer diameter as an outer diameter of the cylindrical portion.

19. An outer ring of a tapered roller bearing, comprising:
a tapered cylinder portion having a tapered raceway surface of the outer ring on an inner periphery;
a radially extending portion that extends in a substantially radial direction of the tapered cylinder portion from an end portion on a small diameter side of the tapered cylinder portion;
a cylindrical portion that is connected at one end to an outer end portion in a radial direction of the radially extending portion, and extends to a large diameter side in a substantially axial direction of the bearing;
a center backup portion that extends from an end portion on the large diameter side of the cylindrical portion to a substantially center portion in an axial direction of an outer peripheral surface of the tapered cylinder portion, and abuts against the substantially center portion; and
a large diameter side curved portion that curves to an outside in the radial direction from an end portion on the large diameter side of the tapered cylinder portion, and in which an outside diameter of an outer end surface in the radial direction is substantially the same as an outside diameter of an outer peripheral surface of the cylindrical portion,
wherein the tapered cylinder portion, the radially extending portion, the cylindrical portion, the center backup portion, and the large diameter side curved portion are formed of a single, monolithic metallic plate, and wherein the substantially center portion is axially spaced from the large diameter side curved portion.

20. A manufacturing method of an outer ring of a tapered roller bearing, comprising:

opening a through-hole by press stamping in a single, monolithic plate made of metal;

forming a tapered cylinder portion by plastic deforming the single, monolithic plate with the through-hole by press forming;

forming a radially extending portion by plastic deforming a small diameter side end of the tapered cylinder portion by press forming;

forming a cylindrical portion that extends to a large diameter side in an axial direction by plastic deforming an outside end in a radial direction of the radially extending portion by press forming;

forming a center backup portion, that extends from an end on a side opposite the radially extending portion side of the cylindrical portion to near a substantially center portion in an axial direction of the tapered cylinder portion, by plastic deforming the end on the side opposite the radially extending portion side of the cylindrical portion by press forming;

forming a large diameter side curved portion by curving the large diameter side end of the tapered cylinder portion by press forming; and grinding an end surface in a radial direction of the large diameter side curved portion, so that an outer diameter of the large diameter side curved portion becomes the same outer diameter as an outer diameter of the cylindrical portion, wherein the tapered cylinder portion, the radially extending portion, the cylindrical portion, the center backup portion, and the large diameter side curved portion are formed of the single, monolithic metallic plate.

21. A manufacturing method of an outer ring of a tapered roller bearing, comprising:

opening a through-hole by press stamping in a discoid single, monolithic plate made of metal;

forming a radially extending portion by plastic deforming the discoid single, monolithic plate with the through-hole by press forming;

forming a tapered cylinder portion, that has an inside diameter that becomes larger farther away from the radially extending portion, on an inside in a radial direction of the radially extending portion by plastic deforming an inside end in the radial direction of the radially extending portion by press forming;

forming a cylindrical portion that extends to a large diameter side in an axial direction on an outside in the radial direction of the radially extending portion by plastic deforming an outside end in the radial direction of the radially extending portion by press forming;

forming a center backup portion, that extends from an end on a side opposite the radially extending portion side of the cylindrical portion to near a substantially center portion in an axial direction of the tapered cylinder portion, on the side opposite the radially extending portion side of the cylindrical portion by plastic deforming that end on the side opposite the radially extending portion side of the cylindrical portion;

forming a large diameter side curved portion by curving a large diameter side end of the tapered cylinder portion by press forming; and grinding an end surface in a radial direction of the large diameter side curved portion, so that an outer diameter of the large diameter side curved portion becomes the same outer diameter as an outer diameter of the cylindrical portion, wherein the tapered cylinder portion, the radially extending portion, the cylindrical portion, the center backup portion, and the large diameter side curved portion are formed of the discoid single, monolithic metallic plate.

* * * * *